United States Patent Office 3,236,866
Patented Feb. 22, 1966

3,236,866
21,21-DIFLUORO PREGNENES
Howard J. Ringold and John Edwards, Mexico City, Mexico, assignors, by mesne assignments, to Syntex Corporation, a corporation of Panama
No Drawing. Filed Mar. 24, 1960, Ser. No. 17,266
Claims priority, application Mexico, Apr. 8, 1959, 54,186
22 Claims. (Cl. 260—397.3)

The present invention relates to novel cyclopentanophenanthrene derivatives and process for the production thereof.

More particularly the invention relates to the novel 21,21-difluoro compounds of the pregnane series and more specifically to 21,21-difluoro-$\Delta^4$-pregnene-3,20-dione which may also contain a double bond at C–1,2 and/or C–6,7, a chlorine, fluorine or methyl substituent at C–6, an α-methyl or β-methyl group at C–16, a β-hydroxy or keto group at C–11 and, in the presence of such substituent at C–11, also a 9α-halo substituent such as chlorine, bromine or fluorine.

The novel compounds of the present invention are potent agents of the progestational type and as such exhibit anti-androgenic, anti-estrogenic and anti-gonadotrophic activity in addition to some progestational activity.

The novel compounds of the present invention may be illustrated by the following formulae:

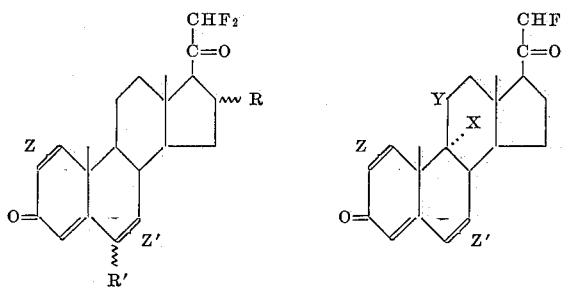

In the above formulae, R represents hydrogen, α-methyl or β-methyl; R' represents hydrogen, methyl, chlorine or fluorine; Y represents β-hydroxy or keto; X represents chlorine, bromine or fluorine; Z and Z' represent a double bond or a saturated linkage between C–1,2 and C–6,7 respectively.

The wavy lines represent a generic expression for the α and β steric configuration of the substituent at C–6 and C–16.

The novel compounds of the present invention are prepared by a process which may be illustrated in part by the following equation in so far as ring D is concerned:

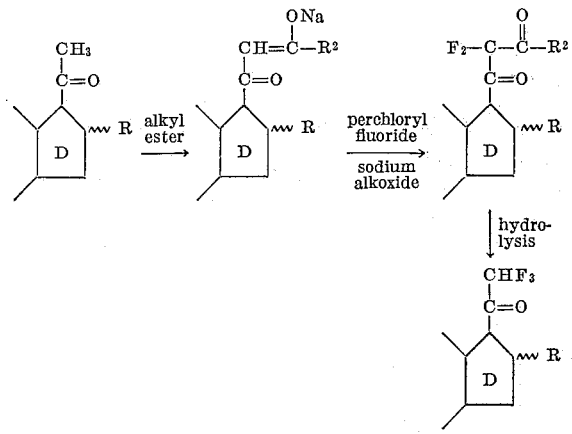

In the above equation R has the same meaning as heretofore set forth. $R^2$ represents hydrogen or carboalkoxy.

In practicing the process above outlined, a 20-keto pregnane is treated with an ester such as a dialkyl oxalate or an alkyl formate in the presence of a molar equivalent of an alkaline substance such as an alkali metal alkoxide, for example, sodium methoxide, or an alkali metal hydride such as sodium hydride in an inert solvent, such as benzene or dioxane to form the sodium salt of the 21-alkoxyoxalyl-20-keto-pregnane when the ester utilized is the oxalate, or the sodium salt of 21-hydroxymethylene-20-keto-pregnane when the formate ester is utilized. The thus formed salt is suspended in an inert solvent such as ethanol or benzene to which another molar equivalent of alkali metal alkoxide is added and a stream of perchloryl fluoride is then introduced to form the 21,21-difluoro-21-alkoxyoxalyl-20-keto-pregnane or the 21,21-difluoro-21-aldehydo-20-keto-pregnane derivative. By subsequent treatment of either the last named compounds with a base such as sodium methoxide or potassium acetate in methanol solution, there is obtained the 21,21-difluoro-20-keto-pregnane compound.

The novel process of this invention is particularly suitable for pregnanes having a secondary side chain at C–17. The condensation with the ester can be carried out with a $\Delta^5$ or $\Delta^{5,9(11)}$ compound having a hydroxyl, acyloxy or ethylenedioxy group at C–3 and which may contain a 16α- or 16β-methyl group; similarly, the condensation can be carried out with $\Delta^{1,4}$-3-ketones, and $\Delta^{1,4,6}$-3-ketones, which may also contain substituents such as methyl, fluorine or chlorine at C–6 in either α or β steric configuration and/or a methyl substituent at C–16 in either α or β steric configuration.

The novel 21,21-difluoro-pregnanes are stable compounds and can be subjected to further chemical reactions and transformations. For example, the introduction of halogen at C–6 proceeds smoothly without affecting the 21,21-difluoro moiety.

The following examples serve to illustrate but are not intended to limit the present invention:

*Example 1*

A mixture of 10 g. of $\Delta^5$-pregnen-3β-ol-20-one, 500 cc. of dry benzene and 1.7 g. of sodium methoxide was treated with 4.6 g. of ethyl oxalate and the mixture was stirred for 2 hours at room temperature. It was then diluted with 400 cc. of anhydrous ether and the sodium salt of the ethyl ester of $\Delta^5$-pregnen-3β-ol-20-one-21-oxalilic acid was collected by filtration and suspended in 50 cc. of absolute ethanol containing 1.7 g. of sodium methoxide.

A slow stream of perchloryl fluoride was then introduced into the above suspension, with continuous stirring, at room temperature, until the reaction no longer showed alkaline reaction. It was then diluted with water and the 21,21-difluoro-21-ethoxyoxalyl-$\Delta^5$-pregnen-3β-ol-20-one was collected by filtration. It was purified by recrystallization from acetone-hexane.

A solution of 7 g. of the above compound in 70 cc. of absolute methanol was treated with 1 g. of sodium methoxide, under stirring, at room temperature and under an atmosphere of nitrogen, for 17 hours. It was neutralized with glacial acetic acid (1.2 cc.), diluted with water and the precipitate of the crude 21,21-difluoro-$\Delta^5$-pregnen-3β-ol-20-one was collected by filtration and purified by recrystallization from acetone-hexane.

Alternatively, this hydrolysis was carried out by refluxing a solution of 0.5 g. of 21,21-difluoro-21-ethoxyoxalyl-$\Delta^5$-pregnene-3-β-ol-20-one and 1 g. of potassium acetate in 40 cc. of methanol for 5 hours. By precipitation in water, conventional isolation and chromatography on alumina, there was obtained 21,21-difluoro-$\Delta^5$-pregnene- 3β-ol-20-one, identical with the one obtained in accordance with the preceding paragraph.

5 g. of the above compound was dissolved in 140 cc. of xylene and 50 cc. of cyclohexanone, 25 cc. was distilled in order to remove traces of moisture, 5 g. of aluminum isopropoxide dissolved in 25 cc. of anhydrous xylene was added in the course of 5 minutes, and the distillation was continued for 40 minutes. Water and ice were added to the cooled mixture and the volatile solvents were removed by steam distillation. The solid was collected by filtration and recrystallized from acetone-hexane, thus yielding 21,21-difluoro-progesterone.

*Example 2*

A mixture of 1 g. of 21,21-difluoro-progesterone prepared in accordance with Example 1, 50 cc. of t-butanol, 0.4 g. of recently sublimed selenium dioxide and 0.2 cc. of pyridine was refluxed under an atmosphere of nitrogen for 48 hours, filtered through celite and the solvent was evaporated under reduced pressure. The residue was refluxed with decolorizing charcoal in acetone for one hour, filtered and the acetone was evaporated; the crude product was purified by chromatography on neutral alumina, thus yielding 21,21-difluoro-$\Delta^{1,4}$-pregnadiene-3,20-dione.

*Example 3*

A mixture of 1 g. of 21,21-difluoro-progesterone prepared in accordance with Example 1, 10 g. of chloranil, 75 cc. of ethyl acetate and 25 cc. of acetic acid was refluxed under an atmosphere of nitrogen for 96 hours. The mixture was cooled, washed with 10% aqueous sodium hydroxide solution until the washings were colorless, then with water, dried over anhydrous sodium sulfate and the solvent was evaporated. By chromatography of the residue on neutral alumina, there was obtained 21,21-difluoro-$\Delta^{4,6}$-pregnadiene-3,20-dione.

1.0 g. of the above compound was refluxed with selenium dioxide in t-butanol and in the presence of pyridine, following the reaction conditions and procedure of isolation of Example 2, thus yielding 21,21-difluoro-$\Delta^{1,4,6}$-pregnatriene-3,20-dione.

*Example 4*

A mixture of 1.0 g. of 21,21-difluoro-$\Delta^{1,4}$-pregnadiene-3,20-dione, obtained in accordance with the method of Example 2, was treated with chloranil according to the method of Example 3 to thus obtain 21,21-difluoro-$\Delta^{1,4,6}$-pregnatriene-3,20-dione, identical with the one obtained in accordance with the method of Example 3.

*Example 5*

A mixture of 10 g. of $\Delta^5$-pregnen-3β-ol-20-one, 500 cc. of dry benzene and 1.7 g. of sodium methoxide was treated with 4.4 g. of ethyl formate and the mixture was stirred for 2 hours at room temperature. It was then diluted with 400 cc. of anhydrous ether and the sodium salt of the 21-hydroxymethylene-$\Delta^5$-pregnen-3β-ol-20-one was collected by filtration and suspended in 50 cc. of absolute ethanol containing 1.7 g. of sodium methoxide.

A slow stream of perchloryl fluoride was then introduced into the above suspension, with continuous stirring, at room temperature, until the reaction no longer showed alkaline reaction. It was then diluted with water and the 21,21-difluoro-21-aldehydo-$\Delta^5$-pregnen-3β-ol-20-one was collected by filtration. It was purified by recrystallization from acetone-hexane.

A solution of 7 g. of the above compound in 70 cc. of absolute methanol was treated with 1 g. of sodium methoxide, under stirring, at room temperature and under an atmosphere of nitrogen for 17 hours. It was neutralized with glacial acetic acid (1.2 cc.), diluted with water and the precipitate of the crude 21,21-difluoro-$\Delta^5$-pregnen-3β-ol-20-one was collected by filtration and purified by recrystallization from acetone-hexane.

Alternatively, this hydrolysis was carried out by refluxing a solution of 0.5 g. of 21,21-difluoro-21-aldehydo-$\Delta^5$-pregnen-3β-ol-20-one and 1 g. of potassium acetate in 40 cc. of methanol for 5 hours. By precipitation in water, conventional isolation and chromatography on alumina, there was obtained 21,21-difluoro-$\Delta^5$-pregnen-3β-ol-20-one, identical with the one obtained in accordance with the preceding paragraph and with Example 1.

*Example 6*

A mixture of 5.0 g. of $\Delta^{1,4}$-pregnadiene-3,20-dione, 300 cc. of dry benzene and 1.0 g. of sodium methoxide was treated with 2.5 g. of ethyl oxalate and the mixture was stirred at room temperature for 2 hours. The mixture was diluted with 200 cc. of anhydrous ether and the sodium salt of the ethyl ester of $\Delta^{1,4}$-pregnadiene-3,20-dione-21-oxalilic acid was collected by filtration and suspended in 30 cc. of absolute ethanol containing 1.0 g. of sodium methoxide.

A slow stream of perchloryl fluoride was then introduced into the suspension with continuous stirring at room temperature until the reaction no longer showed alkaline reaction. It was then diluted with water and 21,21-difluoro-21-ethoxyoxalyl-$\Delta^{1,4}$-pregnadiene-3,20-dione was collected by filtration. It was purified by recrystallization from acetone-hexane.

A solution of 3.8 g. of the above compound in 50 cc. of absolute methanol was treated with 0.7 g. of sodium methoxide, under stirring, at room temperature and under an atmosphere of nitrogen for 17 hours. It was neutralized with glacial acetic acid (0.7 cc.), diluted with water and the precipitate of the crude 21,21-difluoro-$\Delta^{1,4}$-pregnadiene-3,20-dione was collected by filtration and purified by recrystallization from acetone-hexane.

The hydrolysis was also carried out by refluxing a solution of 0.5 g. 21,21-difluoro-21-ethoxyoxalyl-$\Delta^{1,4}$-pregnadiene-3,20-dione and 1.0 g. of potassium acetate in 40 cc. of methanol for 5 hours. By precipitation in water, conventional isolation and chromatography on alumina, there was obtained 21,21-difluoro-$\Delta^{1,4}$-pregnadiene-3,20-dione, identical with the one obtained above.

*Example 7*

By following the procedure of Example 6, $\Delta^{1,4,6}$-pregnatriene-3,20-dione gave 21,21-difluoro-$\Delta^{1,4,6}$-pregnatriene-3,20-dione, identical with the one obtained in accordance with the methods of Example 3 and Example 4.

*Example 8*

By following the procedure of Example 1, 16α-methyl-$\Delta^5$-pregnen-3β-ol-20-one gave 21,21-difluoro-16α-methyl-$\Delta^5$-pregnen-3β-ol-20-one and 21,21-difluoro-16α-methyl-$\Delta^4$-pregnene-3,20-dione.

*Example 9*

By following the procedure of Examples 2, 3, and 4, 21,21-difluoro-16α-methyl-$\Delta^4$-pregnene-3,20-dione obtained in Example 8 was converted into 21,21-difluoro-16α-methyl-$\Delta^{1,4}$-pregnadiene-3,20-dione, 21,21-difluoro-16α-methyl-$\Delta^{4,6}$-pregnadiene-3,20-dione and 21,21-difluoro-16α-methyl-$\Delta^{1,4,6}$-pregnatriene-3,20-dione.

*Example 10*

By following the procedure of Examples 1, 2, 3, and 4, 16β-methyl-$\Delta^5$-pregnen-3β-ol-20-one was converted into 21,21-difluoro-16β-methyl-$\Delta^5$-pregnen-3β-ol-20-one; 21,21-difluoro-16β-methyl-$\Delta^4$-pregnene-3,20-dione; 21,21-difluoro-16β-methyl-$\Delta^{1,4}$-pregnadiene-3,20-dione; 21,21-difluoro-16β-methyl-$\Delta^{4,6}$-pregnadiene-3,20-dione; and 21,21-difluoro-16β-methyl-$\Delta^{1,4,6}$-pregnatriene-3,20-dione.

Example 11

5.0 g. of 21,21-difluoro-progesterone, obtained in Example 1, in 50 cc. of dioxane was treated with 6 cc. of ethyl orthoformate and 180 mg. of p-toluenesulfonic acid and the mixture was stirred at room temperature for 40 minutes; there was then added 15 cc. of pyridine, followed by the slow addition, under stirring, of 600 cc. of water. The reaction product was extracted with ether and the extract was washed with water, dried over anhydrous sodium sulfate and evaporated to dryness. Crystallization of the residue from acetone-hexane yielded 21,21-difluoro-3-ethoxy-$\Delta^{3,5}$-pregnadien-20-one.

A mixture of 5 g. of the above compound, 100 cc. of acetone, 20 cc. of water and 2cc. of sodium acetate was cooled to 0° C. and treated with 1.8 g. of N-chlorosuccinimide followed by 2 cc. of glacial acetic acid; the mixture was stirred at 0° C. for 1 hour and then poured into water; the precipitate formed was collected by filtration, washed with water, dried and recrystallized from acetone-hexane. There was thus obtained 6β-chloro-21,21-difluoro-$\Delta^4$-pregnene-3,20-dione. In order to invert the steric configuration at C-6, a slow stream of dry hydrogen chloride was introduced for one hour into a solution of the latter compound in 100 cc. of glacial acetic acid, at a temperature of around 15° C., the mixture was then poured into water, the precipitate was collected, washed with water, dried and recrystallized from acetone-hexane. The resulting 6α-chloro-21,21-difluoro-$\Delta^4$-pregnene-3,20-dione was refluxed with selenium dioxide in mixture with t-butanol, in the presence of pyridine, and under an atmosphere of nitrogen, in accordance with the procedure described in Example 2. There was thus obtained 6α-chloro-21,21-difluoro-$\Delta^{1,4}$-pregnadiene-3,20-dione.

The latter compound was treated with chloranil in accordance with the method of Example 3 to afford 6-chloro-21,21-difluoro-$\Delta^{1,4,6}$-pregnatriene-3,20-dione.

The 6α-chloro-21,21-difluoro-$\Delta^4$-pregnene-3,20-dione was refluxed with chloranil in mixture with ethyl acetate and acetic acid in accordance with the method of Example 3; there was thus obtained 6-chloro-21,21-difluoro-$\Delta^{4,6}$-pregnadiene-3,20-dione.

Example 12

In accordance with the method described in Example 1, 5 g. of the acetate of $\Delta^{5,9(11)}$-pregnadien-3β-ol-20-one was converted successively into the sodium salt of the ethyl ester of $\Delta^{5,9(11)}$-pregnadien-3β-ol-20-one-21-oxalilic acid, 21,21-difluoro-21ethoxyoxalyl-$\Delta^{5,9(11)}$-pregnadien-3β-ol-20-one, 21,21-difluoro-$\Delta^{5,9(11)}$-pregnadien-3β-ol-20-one and 21,21-difluoro-$\Delta^{4,9(11)}$-pregnadiene-3,20-dione.

The starting material, namely, $\Delta^{5,9(11)}$-pregnadien-3β-ol-20-one 3-acetate was obtained by partial hydrogenation of $\Delta^{5,9(11),16}$-pregnatrien-3β-ol-20-one acetate, described in our copending patent application Serial No. 860,734 filed on December 21, 1959, now abandoned, in accordance with the method described by Djerassi et al. in J. Org. Chem. 16, 1278 (1951).

Example 13

To a solution of 2.85 g. of 21,21-difluoro-$\Delta^{4,9(11)}$-pregnadiene-3,20-dione in 45 cc. of methylene chloride and 76 cc. of dioxane, was added 6.6 cc. of a 1% aqueous solution of perchloric acid and 1.23 g. of N-bromoacetamide and the mixture was stirred at room temperature for 20 minutes. Under vigorous stirring there was then added 1.23 g. of sodium sulfite in 66 cc. of water and the mixture was concentrated to one third of its volume under reduced pressure. The residue was diluted with water and the precipitate was collected by filtration, washed with water, dried and recrystallized from acetone-hexane, thus furnishing 9α-bromo-21,21-difluoro-$\Delta^4$-pregnene-11β-ol-3,20-dione.

A mixture of 1.6 g. of the above compounded, 1.9 g. of recently fused potassium acetate and 80 cc. of acetone was refluxed for 18 hours, most of the acetone was removed by distillation, the residue was diluted with water and the precipitate was collected, washed with water, dried and recrystallized from acetone, thus yielding 21,21-difluoro-9β,11β-oxido-$\Delta^4$-pregnene-3,20-dione.

A solution of 600 mg. of the above compound in 20 cc. of methylene chloride was added at −80° C. and with vigorous stirring to a solution of 1.1 g. of anhydrous hydrogen fluoride in 1.95 g. of tetrahydrofuran, over a period of 5 minutes. The mixture was kept for 10 minutes further at −80° C., then at 0° C. for 7 hours and poured into water containing an excess of sodium bicarbonate. The product was treated with methylene chloride and the extract was washed with water, dried over anhydrous sodium sulfate and evaporated to dryness. Chromatography of the residue on neutral alumina afforded 9α,21,21-trifluoro-$\Delta^4$-pregnen-11β-ol-3,20-dione.

A solution of 500 mg. of the above compound in 20 cc. of glacial acetic acid was treated dropwise under stirring with a solution of 125 mg. of chromium trioxide dissolved in 5 cc. of 50% acetic acid, taking care that the temperature remained below 15° C. It was allowed to stand at room temperature for 1 hour, poured into ice water and the precipitate was collected, washed with water, dried and recrystallized from acetone-ether, thus affording 9α,21,21-trifluoro-$\Delta^4$-pregnene-3,11,20-trione.

In accordance with the method of Examples 2 and 3, the latter compound was converted into 9α,21,21-trifluoro-$\Delta^{4,6}$-pregnadiene-3,11,20-trione, 9α,21,21-trifluoro-$\Delta^{1,4}$-pregnadiene-3,11,20-trione and 9α,21-21-trifluoro-$\Delta^{1,4,6}$-pregnatriene-3,11,20-trione.

Example 14

A solution of 400 mg. of 21,21-difluoro-9β-11β-oxido-$\Delta^4$-pregnene-3,20-dione, produced as described in the preceding example, in 4 cc. of redistilled chloroform was mixed with 3.3 cc. of a chloroform solution containing 1.5 molar equivalents of dry hydrogen chloride, with stirring and in the course of 35 minutes, maintaining the temperature around 0° C. The mixture was kept for one additional hour at 0° C., and then diluted with water; the chloroform layer was separated, washed with aqueous sodium bicarbonate solution and water, dried over anhydrous sodium sulfate and the chloroform was evaporated. Recrystallization of the residue from acetone afforded 9α-chloro-21,21,difluoro-$\Delta^4$-pregnen-11β-ol-3,20-dione.

By following the procedures of Examples 2, 3 and 4, the above compound was converted into 9α-chloro-21,21-difluoro-$\Delta^{1,4}$-pregnadien-11β-ol-3,20-dione, 9α-chloro-21,21-difluoro-$\Delta^{4,6}$-pregnadien-11β-ol-3,20-dione and 9α-chloro-21,21-difluoro-$\Delta^{1,4,6}$-pregnatrien-11β-ol-3,20-dione.

Example 15

In accordance with the methods of Examples 2, 3, and 4, 9α,21,21-trifluoro-$\Delta^4$-pregnen-11β-ol-3,20-dione obtained as described in Example 13, was converted into 9α,21,21-trifluoro-$\Delta^{1,4}$-pregnadien-11β-ol-3,20-dione, 9α,21,21-trifluoro-$\Delta^{4,6}$-pregnadien-11β-ol-3,20-dione and 9α,21,21-trifluoro-$\Delta^{1,4,6}$-pregnatrien-11β-ol-3,20-dione.

Example 16

In accordance with the method of Example 1, 6α-methyl-$\Delta^{1,4}$-pregnadiene-3,20-dione, described in Belgium Patent No. 576,345, was treated with ethyl oxalate in benzene solution and in the presence of sodium methoxide to produce the sodium salt of the ethyl ester of 6α-methyl-$\Delta^{1,4}$-pregnadiene-3,20-dione-21-oxalilic acid; treatment with perchloryl fluoride gave 6α-methyl-21,21-difluoro-21-ethoxyoxalyl-$\Delta^{1,4}$-pregnadiene-3,20-dione. Hydrolysis of the above compound with potassium acetate in methanol solution afforded finally 6α-methyl-21,21-difluoro-$\Delta^{1,4}$-pregnadiene-3,20-dione.

Example 17

By following the procedure of the previous example but using 6-methyl-Δ$^{1,4,6}$-pregnatriene-3,20-dione (described in Belgium Patent No. 576,345) as starting material, there was obtained 6-methyl-21,21-difluoro-Δ$^{1,4,6}$-pregnatriene-3,20-dione.

Example 18

In accordance with the method of Example 17, 5 g. of 6α-fluoro-1-dehydro-progesterone, was converted successively into the sodium salt of the ethyl ester of 6α-fluoro-Δ$^{1,4}$-pregnadiene-3,20-dione 21-oxalilic acid, 6α, 21,21 - trifluoro - 21 - ethoxyoxalyl - Δ$^{1,4}$ - pregnadiene-3,20-dione and finally into 6α,21,21-trifluoro-Δ$^{1,4}$-pregnadiene-3,20-dione.

Treatment of the above compound with chloranil in mixture of ethyl acetate and acetic acid, in accordance with the procedure of Example 3, gave 6,21,21-trifluoro-Δ$^{1,4,6}$-pregnatriene-3,20-dione.

The starting material, 6α-fluoro-1-dehydro-progesterone was obtained by selenium dioxide oxidation of 6α-fluoro-progesterone, described by Bowers et al. in Tetrahedron 1958, vol. 3, pp. 14–27.

Example 19

By following the procedure of Example 11, 2 g. of 21, 21-difluoro-16α-methyl-Δ$^4$-pregnene - 3,20-dione obtained as described in Example 9, was converted into 6β-chloro-21,21, difluoro-16α-methyl - Δ$^4$ - pregnene-3,20-dione and then into 6α - chloro - 21,21 - difluoro - 16α - methyl - Δ$^4$-pregnene-3,20-dione. Upon treatment with selenium dioxide in t-butanol, in accordance with the method of Example 2, there was obtained 6α-chloro-21,21-difluoro-16α - methyl - Δ$^{1,4}$ - pregnadiene-3,20-dione. Upon treatment of the latter compound with chloranil as described in Example 3, there was obtained 6-chloro-21,21-difluoro-16α-methyl-Δ$^{1,4,6}$-pregnatriene-3,20-dione.

By following the procedure of Example 3, 6α-chloro-21,21 - difluoro-16α-methyl - Δ$^4$ - pregnene-3,20-dione was converted into the 6-chloro-21,21-difluoro-16α-methyl-Δ$^{4,6}$-pregnadiene-3,20-dione.

Example 20

By substituting in the preceding Example, 16β-methyl-21,21-difluoro-Δ$^4$-pregnene-3,20 dione (obtained in accordance with the method of Example 10), there was obtained 6α - chloro - 21,21 - difluoro - 16β - methyl - Δ$^4$-pregnene-3,20-dione, 6α-chloro-21,21-difluoro-16β-methyl Δ$^{1,4}$-pregnadiene-3,20-dione, 6-chloro-21,21-difluoro-16β-methyl-Δ$^{4,6}$-pregnadiene-3,20-dione and 6-chloro-21,21-difluoro-16β-methyl-Δ$^{1,4,6}$-pregnatriene-3,20-dione.

Example 21

A slow stream of perchloryl fluoride was introduced for 1 hour, into a suspension of 10 g. of the sodium salt of the ethyl ester of Δ$^5$-pregnen-3β-ol-20-one-21-oxalilic acid in 200 cc. of anhydrous benzene. Air was then passed through the solution for 10 minutes and then 1.7 g. of sodium methoxide in 50 cc. of methanol was added. The reaction mixture was treated again with perchloryl fluoride for 1 hour more, diluted water, and the 21,21-difluoro - 21 - ethoxyoxalyl - Δ$^5$-pregnen-3β-ol-20-one collected by filtration.

We claim:

1. A method for the production of a 21,21-difluoro-20-keto-steroid of the pregnane series which comprises reacting a 21-hydroxymethylene-20-keto-pregnane with perchloryl fluoride to form the corresponding 21,21-difluoro-21-aldehydo-20-keto-pregnane and hydrolyzing with a base to form the corresponding 21,21-difluoro-20-keto-pregnane.

2. A compound of the following formula:

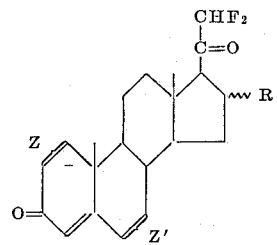

wherein R is selected from the group consisting of α-methyl and β-methyl; Z is selected from the group consisting of a double bond between C–1 and C–2 and a saturated linkage between C–1 and C–2; and Z' is selected from the group consisting of a double bond between C–6 and C–7 and a saturated linkage between C–6 and C–7 with at least one Z and Z' being a double bond.

3. 16 - methyl - 21,21 - difluoro - Δ$^{1,4}$ - pregnadiene-3,20-dione.

4. 16 - methyl - 21,21 - difluoro - Δ$^{4,6}$ - pregnadiene-3,20-dione.

5. 16α - methyl - 21,21 - difluoro - Δ$^{1,4,6}$ - pregnatriene-3,20-dione.

6. 16β - methyl - 21,21 - difluoro - Δ$^{1,4,6}$ - pregnatriene-3,20-dione.

7. A compound of the following formula:

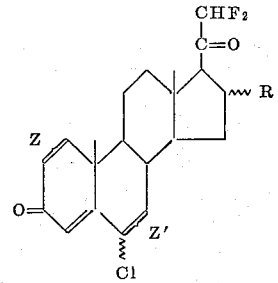

wherein R is selected from the group consisting of hydrogen, α-methyl and β-methyl; Z is selected from the group consisting of a double bond between C–1 and C–2 and a saturated linkage between C–1 and C–2; and Z' is selected from the group consisting of a double bond between C–6 and C–7 and a saturated linkage between C–6 and C–7.

8. 6α - chloro - 21,21 - difluoro - Δ$^4$ - pregnene - 3,20-dione.

9. 6α - chloro - 21,21 - difluoro - Δ$^{1,4}$ - pregnadiene-3,20-dione.

10. 6 - chloro - 21,21 - difluoro - Δ$^{4,6}$ - pregnadiene-3,20-dione.

11. 16 - methyl - 6α - chloro - 21,21 - difluoro - Δ$^4$-pregnene-3,20-dione.

12. A compound of the following formula:

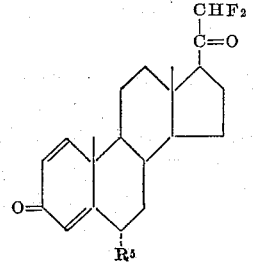

wherein R$^5$ is selected from the group consisting of methyl and fluorine.

13. 6α,21,21-trifluoro-Δ$^{1,4}$-pregnadiene-3,20-dione.

14. A compound of the following formula:

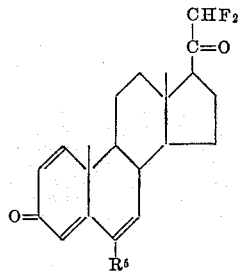

wherein R[5] is selected from the group consisting of methyl and fluorine.

15. 6 - methyl - 21,21 - difluoro - $\Delta^{1,4,6}$ - pregnatriene-3,20-dione.

16. 6,21,21-trifluoro-$\Delta^{1,4,6}$-pregnatriene-3,20-dione.

17. A compound of the following formula:

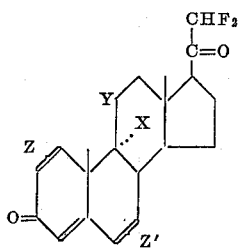

wherein X is selected from the group consisting of chlorine, bromine and fluorine; Y is selected from the group consisting of β-hydroxy and keto; Z is selected from the group consisting of a double bond between C-1 and C-2 and a saturated linkage between C-1 and C-2; and Z' is selected from the group consisting of a double bond between C-6 and C-7 and a saturated linkage between C-6 and C-7.

18. 9α,21,21-trifluoro-$\Delta^4$-pregnene-3,11,20-trione.
19. 9α,21,21-trifluoro-$\Delta^4$-pregnen-11β-ol-3,20-dione.
20. 9α,21,21-trifluoro-$\Delta^{1,4}$-pregnadiene-3,11,20-trione.
21. 9α,21,21 - trifluoro - $\Delta^{1,4}$-pregnadien - 11β - ol-3,20-dione.
22. 9α,21,21 - trifluoro - $\Delta^{1,4,6}$ - pregnatriene - 3,11,20-trione.

References Cited by the Examiner

UNITED STATES PATENTS

| | | | |
|---|---|---|---|
| 2,837,464 | 6/1958 | Nobile | 195—51 |
| 2,882,282 | 4/1959 | Agnello et al. | 260—397.3 |
| 2,953,581 | 9/1960 | Jensen | 260—397.3 |
| 2,965,654 | 12/1960 | Bergstrom | 260—397.3 |

OTHER REFERENCES

Nakanishi et al., J.A.C.S., vol. 81, 1959, pp. 5259–60.
Ringold et al., J.A.C.S., vol. 80, 1958, p. 6464.

LEWIS GOTTS, *Primary Examiner*.

L. H. GASTON, MORRIS LIEBMAN, *Examiners*.